(12) United States Patent
Marfell et al.

(10) Patent No.: US 11,432,544 B2
(45) Date of Patent: Sep. 6, 2022

(54) COMPOSITION AND RELATED METHODS OF MANUFACTURE AND USE

(71) Applicant: Donaghys Limited, Christchurch (NZ)

(72) Inventors: Jarred Marfell, Christchurch (NZ); Jeremy Silva, Christchurch (NZ); Karen Yeritsyan, Christchurch (NZ)

(73) Assignee: Donaghys Limited, Christchurch (NZ)

( * ) Notice: Subject to any disclaimer, the term of this patent is extended or adjusted under 35 U.S.C. 154(b) by 0 days.

(21) Appl. No.: 17/482,362

(22) Filed: Sep. 22, 2021

(65) Prior Publication Data

US 2022/0007640 A1    Jan. 13, 2022

Related U.S. Application Data

(63) Continuation of application No. PCT/NZ2020/050143, filed on Nov. 5, 2020.

(30) Foreign Application Priority Data

Nov. 8, 2019 (NZ) .......................................... 759005
Jul. 10, 2020 (NZ) .......................................... 766151

(51) Int. Cl.
| | |
|---|---|
| *A01N 25/26* | (2006.01) |
| *A01N 37/38* | (2006.01) |
| *A01N 43/40* | (2006.01) |
| *A01N 43/90* | (2006.01) |
| *A01N 57/20* | (2006.01) |
| *C05G 5/30* | (2020.01) |
| *C05B 1/02* | (2006.01) |
| *C05C 3/00* | (2006.01) |
| *C05C 9/00* | (2006.01) |
| *C05D 3/02* | (2006.01) |
| *C05D 5/00* | (2006.01) |

(52) U.S. Cl.
CPC ............ *A01N 25/26* (2013.01); *A01N 37/38* (2013.01); *A01N 43/40* (2013.01); *A01N 43/90* (2013.01); *A01N 57/20* (2013.01); *C05B 1/02* (2013.01); *C05C 3/00* (2013.01); *C05C 9/00* (2013.01); *C05D 3/02* (2013.01); *C05D 5/00* (2013.01); *C05G 5/30* (2020.02)

(58) Field of Classification Search
None
See application file for complete search history.

(56) References Cited

U.S. PATENT DOCUMENTS

| | | | |
|---|---|---|---|
| 8,852,642 B2 | 10/2014 | Pentland et al. | |
| 2010/0113269 A1 | 5/2010 | Pearson et al. | |
| 2015/0291481 A1* | 10/2015 | Neff | C08G 18/329 |
| | | | 504/347 |
| 2017/0245492 A1* | 8/2017 | Amir | C08G 83/004 |
| 2019/0124916 A1* | 5/2019 | Tulley | A01N 25/10 |
| 2020/0148605 A1* | 5/2020 | Burnham | C05B 15/00 |

FOREIGN PATENT DOCUMENTS

| | | | | |
|---|---|---|---|---|
| CN | 103102223 A | | 5/2014 | |
| CN | 110651786 A | * | 1/2020 | ............. A01N 25/28 |
| WO | 1990007275 A1 | | 7/1990 | |
| WO | 1996023408 A1 | | 8/1996 | |
| WO | WO-9623408 A1 | * | 8/1996 | ............... C05C 3/00 |
| WO | 2006086662 A2 | | 8/2006 | |
| WO | 2014078642 A1 | | 5/2014 | |
| WO | 2020102420 A1 | | 5/2020 | |

OTHER PUBLICATIONS

International Search Report and Written Opinion issued in PCT/NZ2020/050143, dated Feb. 10, 2021.

* cited by examiner

*Primary Examiner* — Alton N Pryor
(74) *Attorney, Agent, or Firm* — ARC IP Law, PC; Joseph J. Mayo

(57) ABSTRACT

Described herein is a stable dry composition comprising a compound with herbicide activity located on a carrier compound and a compound with amphiphilic properties coating at least part or all of the compound with herbicide activity and carrier compound. Methods of manufacture and application of the dry composition are also described along with storage stable plant and herbicide compositions and methods of co-administration of combination plant and herbicide compositions.

20 Claims, 20 Drawing Sheets

COMPOSITION AND RELATED METHODS OF MANUFACTURE AND USE

RELATED APPLICATIONS

This application is a continuation of PCT application PCT/NZ2020/050143, filed 5 Nov. 2020, which derives priority from New Zealand patent application number 759005 dated 8 Nov. 2019 WIPO DAS code BF53 and New Zealand patent application number 766151 dated 10 Jul. 2020 WIPO DAS code 1C98, the specifications of which are hereby incorporated herein by reference.

TECHNICAL FIELD

Described herein is a composition and related methods of manufacture and use. More specifically, described herein is a stable dry composition with herbicidal activity; methods of manufacture of the dry composition; methods of application of the dry composition; storage stable plant and herbicide compositions and methods of co-administration of combination plant and herbicide compositions.

BACKGROUND

Herbicidal compositions are generally aqueous solutions typically as concentrates of a particular herbicide compound mixed with solvent(s) and stabilisers. Such compositions have known limitations around handling (spray drift, dilution at application) and shear weight and volume leading to effectively paying to transport and store water or other solvents along with the herbicide.

Stability of liquid herbicide compositions is also an issue addressed in the art using many different additives solvents, co-solvents, stabilisers and so on. Whilst many of these art solutions may be useful e.g. to increase the concentration of herbicide in the compositions yet avoid separation, they introduce extra manufacturing steps, extra manufacturing costs and so on beyond just suppling the herbicide itself. As one example, glyphosate is a well-known and widely used herbicide. Glyphosate, however, requires prior reaction to a salt form before manufacture into a concentrate so that the glyphosate is liquid dispersible.

Art herbicidal dry compositions are quite unusual and then only dried and supplied for storage purposes. That is, the herbicide is not used or applied in a dry form but instead typically mixed with a liquid e.g. water, immediately prior to broadcast. Whilst dry storage may address transport and storage issues of liquid formulations, the step of mixing before broadcast detracts from the product versatility— indeed, dissolving some herbicides can be difficult in a purpose built facility let alone in situ at a farm or residential home. Another drawback of art herbicidal dry compositions are that they are known to have handling issues from dust. As a result of dust formation, the user needs to be careful not to breathe the dust and not to have dust blow away from target broadcast areas. As a result, liquid concentrates tend to dominate the market for herbicides however, liquid concentrates also have spray drift issues akin to dust spread.

A further aspect of art herbicide compositions is that they are almost always exclusively formulated for and directed for foliar application to plants. Alternative modes of delivery such as to the ground surface or into the ground via for example drilling is to the inventor's understanding not completed or at least not completed to a commercial scale. This is understood to be because art products such as liquid concentrates have poor efficacy from ground broadcast.

Art herbicide compositions are also generally single active formulations or less commonly, herbicide combinations generally using chemically compatible herbicides. There may be stability or commercial reasons for single or compatible combinations however, this does create more work. For example, in a pasture renewal scenario, a farmer has to apply herbicide and then again at a later date re-seed the ground and optionally later again apply fertiliser or minerals. For a small land area, the cost of multiple applications in labour and materials may be minor or an inconvenience however, the large land areas and for isolated land areas, multiple applications may make this process uneconomic. In the context of farming, high costs limit the amount of land able to be used for food production. The same principles would apply for other land uses like forestry and conservation land development and growth. Reducing the number of applications through combination broadcast of for example a fertiliser or mineral and herbicide (and even seed) may have a huge impact on cost/returns.

A yet further drawback of many art herbicide compositions is that they can only be applied during dry weather. Application when rain occurs or when rain is predicted prevents broadcast since the rain may wash or dilute the herbicide therefore reducing dose rates to vegetation and, in worst cases, resulting in run off of herbicide into the environment such as water ways.

It may be of benefit to address at least some of the above art issues and problems.

Further aspects and advantages of the composition and related methods of manufacture and use will become apparent from the ensuing description that is given by way of example only.

SUMMARY

Described herein is a stable dry composition with herbicidal activity; methods of manufacture of the dry composition; methods of application of the dry composition; storage stable plant and herbicide compositions and methods of co-administration of combination plant and herbicide compositions.

In a first aspect, there is provided a dry composition comprising a compound with herbicide activity located on a carrier compound and a compound with amphiphilic properties coating at least part or all of the compound with herbicide activity and carrier compound.

In a second aspect, there is provided a method of shipping and storing a herbicide formulation by the step of forming a dry composition comprising a compound with herbicide activity located on a carrier compound and a compound with amphiphilic properties coating at least part or all of the compound with herbicide activity and carrier compound.

In a third aspect, there is provided a method of manufacturing a herbicidally effective dry composition comprising the steps of:
- selecting a granulated carrier;
- applying herbicide to the carrier surface;
- drying the sprayed herbicide and carrier;
- coating the dried herbicide and carrier with an amphiphilic compound.

In a fourth aspect, there is provided a method of broadcasting of a dry composition with herbicidal activity by:
- providing a dry composition comprising a compound with herbicide activity located on a carrier compound and a compound with amphiphilic properties coating at least part or all of the compound with herbicide activity and carrier compound; and broadcasting the dry composition to: a plant or part thereof; the ground surface surrounding a plant or part thereof; into the ground surrounding a plant or part thereof; and combinations thereof.

In a fifth aspect, there is provided a method of co-administration of dry composition with herbicide activity and a plant seed by the steps of:
selecting a dry composition substantially as described above
selecting plant seed;
mixing the dry composition and plant seed together as a dry mixture and storing the mixture until ready for use; then
applying the mixture to the ground surface or drilling the mixture into the ground.

In a sixth aspect, there is provided a method of producing a dry composition with herbicidal activity and seed formulated for combined storage and concurrent broadcast, the method comprising the steps of:
selecting a granulated carrier;
applying herbicide to the carrier surface;
drying the sprayed herbicide and carrier;
coating the dried herbicide and carrier with an amphiphilic compound to form a dry composition; and
mixing the dry composition with plant seed.

In a seventh aspect, there is provided a method of seeding land comprising:
providing a volume of plant seed containing herbicide dry composition, the plant seed containing herbicide dry composition comprising:
plant seed;
a dry composition with herbicide activity substantially as described above mixed with the plant seed;
optionally, shipping and storing the mixture of plant seed and dry composition; and
broadcasting the plant seed and dry composition mixture to a growing substrate.

The dry composition and related methods of manufacture and use may provide a number of advantages over the art. Some selected advantages may include providing a dual activity product applied in one application; ease of shipping and storage; and, due to dry application, greater broadcast control occurs with no drift to undesired vegetation or area. More advantages should become apparent from the description below.

DETAILED DESCRIPTION

As noted above, described herein is a stable dry composition with herbicidal activity; methods of manufacture of the dry composition; methods of application of the dry composition; storage stable plant and herbicide compositions and methods of co-administration of combination plant and herbicide compositions.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'herbicide' or grammatical variations thereof as used herein refers to a compound or substance that is detrimental to germination, or propagation and/or growth of plants.

The term 'coat' or grammatical variations thereof as used herein refers to a covering on part or all of the external surface of a carrier and herbicide on the carrier.

The term 'located on' or grammatical variations thereof in relation to herbicide compound and carrier compound describes that the herbicide compound is substantially located on the outer surface of a carrier compound. That is, the herbicide does not penetrate inside the carrier structure to become a homogenous mixture but rather forms an external layer on a carrier surface. Within this definition, is that the herbicide may be located inside carrier compound pores or openings but is not substantially inside the carrier itself at a level below the surface or external pore surface of the carrier compound i.e. some absorption may occur but the majority (or all) is not absorbed.

Dry Composition

In a first aspect, there is provided a dry composition comprising a compound with herbicide activity located on a carrier compound and a compound with amphiphilic properties coating at least part or all of the compound with herbicide activity and carrier compound.

The term 'compound with herbicide activity' is referred to as a herbicide hereafter.

The term 'compound with amphiphilic properties' is referred to as an amphiphilic compound hereafter.

Reference to singular does not exclude the plural meaning and vice versa i.e. multiple herbicides and multiple amphiphilic compounds may be used to form the dry composition described.

Single Product

The dry composition may be a single product configured to be storage stable and, when broadcast to a site, acts to deter or kill localised plant growth as defined by the herbicide activity and can optionally also support soil nutrients levels and/or vegetation nutrition depending on the carrier chosen i.e. stable storage and delivery on application of herbicide and soil conditioning agent/fertiliser as one product applied once.

Dry

In the context of this specification, the term dry may refer to a water activity of less than 0.7, or 0.6 or 0.5, or 0.4 or 0.3, or 0.2, or 0.1. Alternatively, the term dry may refer to a moisture content of the dried coated seed being less than 10%, or 9%, or 8%, or 7%, or 6%, or 5% by weight.

As may be appreciated, the residual water content of the composition is low or very low and as a result, the composition may be formulated as a particle, dust, powder, cake, prill or granular composition. For ease of description below, granules may be referred to although this is not intended to exclude other formulations or forms. The granules (or prills or other dry forms) may have an average grain size from 0.2 to 1 mm although this size and size distribution may vary considerably.

The dry composition may be stored prior to use in a sealed bag or container to avoid contact with moisture and elution. Dry compositions may be hydroscopic hence storage in a sealed manner may be useful to prevent absorption of moisture in the air or humidity.

Herbicide

The compound with herbicide activity is now described noting that the terms 'herbicide' and 'compound with herbicide activity' may be used interchangeably herein.

In one embodiment, the herbicide may be a non-selective herbicide or a selective herbicide.

The herbicide may be a contact herbicide active.

The herbicide may have activity against broadleaf weeds, brush weeds, gorse, broom, and thistles.

The herbicide may be soluble and/or able to be emulsified in aqueous solutions or other solvents.

The herbicide may be in salt form.

Specific herbicides that could be used in the dry composition may be selected from: glyphosate (glycine's, group M (inhibitors of EPSP hormone) or group 9 (aromatic amino acid inhibitors), glyfosinate, glyfumesate, desmedipham, phenmedipham, MCPB, bentazone, dicamba, flumetsulam, phenoxy herbicides; 3,5,6-Trichloro-2-pyridinyloxyacetic acid; picolinic acid herbicides; and combinations thereof.

The phenoxy herbicides described above may be 2,4-D and 2-methyl-4-chlorophenoxyacetic acid commonly known as MCPA.

3,5,6-Trichloro-2-pyridinyloxyacetic acid described above may also be termed or commonly known as triclopyr.

The picolinic acid herbicides described above may be 3,6-dichloro-2-pyridinecarboxylic acid commonly known as clopyralid.

As may be appreciated, the claimed dry composition is highly versatile and many different types of herbicide may be used, the herbicides having many different types of activity.

Herbicide Quantity

As noted above, the dry composition comprises sufficient concentration of herbicide to be a herbicidally-effective when applied.

The exact concentration of herbicide compound used in the dry composition may vary depending on factors such as: the type of carrier used, the manufacturing process used e.g. concentration of herbicide relative to carrier quantities in the dry composition.

The concentration of herbicide used may compare with standard amounts of herbicide application per area for traditional liquid and foliar applied herbicide products.

By way of example, a standard spray application rate of glyphosate may be 1440-1450 g/ha, so the dry composition described may comprise granules in amount to cover 1 ha and in total to contain 1440 g of glyphosate hence has a comparable concentration or herbicide loading to art aqueous spray application concentrations.

In one embodiment, the herbicide may comprise 0.1-60% weight of the dry composition.

Multiple Herbicides

More than one type of herbicide may be used in the dry composition. This may be useful to allow co-application of multiple types of herbicide in one product and one application.

Where multiple herbicides are used, the herbicides selected may have a similar activity. Alternatively, the herbicides chosen may have different activities.

For example, the dry composition may comprise two herbicides, a first herbicide with selective properties to certain species of plant while the second herbicide used may also be selective but to other species of plant to the first herbicide used. Alternatively, a first herbicide used may be selective and a second herbicide used may be non-selective.

Other Active Compounds

It was also found that pesticides such as fungicides and insecticides may also be included in the composition. In these embodiments, the activity of the pesticide compounds selected may also be storage stable and dry like the herbicides chosen and release at a rate determined by the formulation components and physical make up.

Carrier

The carrier may provide a solid or semi-solid substrate on which the herbicide is received and located during storage prior to application.

The carrier and herbicide may be compatible i.e. the carrier is inert relative to the herbicide and may not alter the herbicidal activity.

The carrier may comprise 2-99.8% weight of the dry composition.

The carrier may be selected to improve soil condition and/or provide nutritional value to vegetation.

In one embodiment, the carrier may be a fertiliser or mineral.

Examples of carrier compounds may be: lime, urea, phosphate, phosphate salts, super phosphate, ammonium sulphate, NPK, NPKS, magnesium oxide, gypsum and combinations thereof.

Ammonium sulphate and other carrier compounds noted above may be useful as they may act as a carrier for herbicide and also have a fertiliser effect and hence act as a growth promotor for present in the ground or administered with the dry composition and administered subsequent to dry composition broadcast. Ammonium sulphate and other fertilisers may also be effective adjuvants for water soluble herbicides.

Carrier and Herbicide Location/Absorption

The carrier retains the herbicide substantially on the carrier surface. This aspect is described further below noting though that a discrete separation exists between the carrier and herbicide and these compounds are not homogenous.

Retention may be a chemical or physical process noting that the herbicide activity does not alter as part of retention.

Retention may also be termed absorption herein. Specifically as used herein, the terms 'retention' or 'absorption' or grammatical variations thereof are synonymous with the term 'located on' as defined above, to refer to the herbicide being located on the surface of carrier Carrier Specific to Herbicide Used The carrier chosen may be defined by the type of herbicide used and the herbicide properties.

For a selective herbicide, the carrier may for example be urea or a granular fertiliser. The selective herbicide in this embodiment may for example be water soluble or water insoluble.

For a non-selective/water soluble herbicide, the carrier may for example be ammonium sulphate although other carriers may also be used.

For a foliar applied dry composition, the dry composition may for example be formulated for foliar application and absorption by vegetation leaves, stems and other above ground plant matter and the carrier chosen to provide nutrients to the foliar matter of vegetation not impacted by the herbicide.

For a soil applied dry composition, the dry composition may for example be formulated for soil application and absorption by vegetation roots and the carrier chosen to address a soil mineral deficiency or chosen to provide nutrients to the roots of vegetation not impacted by the herbicide.

As should be appreciated from the above, a variety of different applications, herbicides and carrier compounds may be chosen.

Amphiphilic Coating

As noted above, the amphiphilic compound coats the carrier and herbicide.

The amphiphilic compound may be in the form of a liquid, solid; a supersaturated suspension, or an emulsion.

The amphiphilic compound may be configured to delay release of the herbicide and carrier post application The amphiphilic compound may have emulsifier properties.

The amphiphilic compound may be water soluble; water absorbing; attract moisture; water dispersible; at least partly hygroscopic; and combinations thereof.

The amphiphilic compound may be a synthetic or natural molecule having the ability to self-assemble into a wide variety of structures including liposomes, bilayer sheets, micelles, vesicles, nanotubes, nanofibers, and lamellae or combinations thereof. The exact structure of self-assembly may be dependent on depending on hydration and temperature.

In one example, the amphiphilic compound may be selected from the group of phosphoglyceride or phosphotide compounds. These are compounds from the group of yellow-brownish fatty substances occurring in animal and plant tissue which are amphiphilic. The may be mixtures of glycerophospholipids including for example: phosphatidylcholine, phosphatidylethanolamine, phosphatidylinositol, phophatidylserine, phosphatidylglycerol and phosphatidic acid.

The phosphoglyceride or phosphotide compounds used to form the coating may comprise for example:

lecithin;
hydrogenated lecithin;
lysolecithin;
hydrogenated lysolecithin;
phospholipids;
hydrolysed phospholipids;
phosphatidic acid;
lysophosphatidic acid;
phosphatidylglycerol;
lypophosphatidylglycerol;
phosphatidylserine;
ammonium phosphatidyl rapeseedate;
phosphatidylcholine;
hydrogenated phosphatidylcholine;
hydrogenated lysophosphatidylcholine;
lysophosphatidylethanolamine;
phosphatidylositol.

In one embodiment, the amphiphilic compound may be lecithin. Lecithin was identified by the inventors as a particularly useful coating compound. Lecithin is a generic term to designate any group of yellow-brownish fatty substances occurring in animal and plant tissues or complex mixture of glycerophospholipids obtained from animal, vegetable or microbial sources, containing varying amounts of substances such as triglycerides, fatty acids, glycolipids, sterols, and sphingophospholipids The lecithin may be natural or synthetic. In naturally occurring lecithin, the phosphoric acid is attached to the glycerol at the α-position. However, the phosphoric acid can also be attached in the β-position of glycerine, as a by-product of synthesis;

Coating Quantity

The coating may comprise approximately 0.01 to 50%, or about 0.02 to 10%, or about 0.05 to 5%, or about 0.1 to 2% by weight dry composition.

Elution

The coating readily elutes once broadcast to a substrate and exposed to moisture. Moisture may be in the form of rain, irrigation or even with minor amounts of water such as that obtained from night or morning dew or humid ambient conditions.

Rate of Coating Compound Breakdown and Release of Herbicide

The coating may act to control the rate of release of herbicide and carrier from the dry composition when broadcast.

The amphiphilic compound chosen may itself confer a rate of release typically governed by the elution rate of the amphiphilic compound itself post broadcast.

The rate of release or elution rate of the coating/amphiphilic compound may be adjusted by use of additives mixed with the amphiphilic compound to change the release/elution characteristics.

In one embodiment for example, adding high HLB surfactant (HLB>10) to lecithin will create a coating with rapid (˜2 hours) release of non-selective herbicide post broadcast, e.g. glyphosate or glyfosinate.

Alternatively, by adding low water solubility solid additives, for example calcium carbonate or clays, it is possible to produce a slow release (12-24 hours) dry composition e.g. tribenuron-methyl or metribuzin or metazachlor may be added. Clays generally, such as bentonite clays, are useful elution rate adjustor compounds due to their ability to absorb water and then slowly release it and therefore delay the rate of elution.

The inventor has found that, by use of additives, the rate of release of herbicide from the dry composition post broadcast may be varied from a rapid release to a slow release, the rate or release being either as one bolus amount (e.g. all herbicide elution completed after 2 hours post contact with water/moisture); or as a dosed constant rate of release over time (e.g. through use of clays evenly mixed with amphiphilic compound to form the coating); or as a variable rate of release of time (e.g. through use of clays unevenly mixed with amphiphilic compound to form the coating). The degree of tuning in the rate of release provides considerable product versatility.

Soil Broadcast

The coating may enable delivery of herbicide via soil to roots of vegetation.

Typically, herbicides are applied to foliage of plants and not via soil. The finding that a dry composition drilled or otherwise applied to soil had a herbicidal effect on plants in the soil was unexpected and may be beneficial.

The dry composition may be formulated for direct foliage or soil application.

Flaking Off or Dusting

The inventors have found that the flaking off or dusting issue and negative effects of enclosed herbicide on carriers may be addressed through coating with the above coating compound(s). This may eliminate or significantly reduce a significant problem in art formulations for handling and product longevity.

Method of Shipping and Storing Herbicide Containing Formulations

In a second aspect, there is provided a method of shipping and storing a herbicide formulation by the step of forming a dry composition comprising a compound with herbicide activity located on a carrier compound and a compound with amphiphilic properties coating at least part or all of the compound with herbicide activity and carrier compound.

The carrier compound in the above method may be a fertiliser or other agriculturally acceptable carrier compound.

The dry composition described above may provide a storage stable and dry method of shipping and storing a herbicide. Typically herbicides are often shipped and stored in liquid concentrate form. In the art, the issue is that herbicides are usually concentrates, therefore they need to be diluted before use. The formulation described herein, does not comprise water or liquid hence the weight/volume for transport is reduced and further, dilution steps on application are avoided since the dry composition is used as provided. Another advantage is that normally herbicides and fertilisers or other agricultural chemicals are transported, stored and applied separately. The method described avoids the need for separate transport, storage and application thereby reducing cost and complexity.

Method of Manufacture of a Dry Composition with Herbicidal Activity

In a third aspect, there is provided a method of manufacturing a herbicidally effective dry composition comprising the steps of:
selecting a granulated carrier;
applying herbicide to the carrier surface;
drying the sprayed herbicide and carrier;
coating the dried herbicide and carrier with an amphiphilic compound.

Further drying of the coated dried herbicide, carrier and amphiphilic compound may be completed.

Coating Method

The process of coating may be via methods such as: mixing, rolling, or dipping the dried carrier and herbicide into the coating composition to form the coating layer or layers.

Carrier Selection

The carrier chosen may depend on the herbicide properties and application requirements. For example, lime may be chosen for acidic soils, magnesium oxide chosen for soils with magnesium deficiency, etc.

Coating Additives

Optionally, the coating may comprise additives mixed with the amphiphilic compound or placed over the amphiphilic compound to alter the elution rate of the coating and hence rate of release of herbicide from the dry composition post broadcast.

Applying by Spraying

Applying of herbicide to the carrier may be completed by spraying the herbicide onto the carrier.

Spraying may be completed by mixing the herbicide with water or other aqueous or non-aqueous solution/solvent at a desired concentration.

Sprayers such as atomisers and pressure sprayers may be used.

Cake

Prior to drying, the carrier and herbicide may form a cake. The term 'cake' as used herein refers to the consistency of the mixture which may vary from solid to semi-solid and form a mass or block that is able to shaped or kneaded while wet. The consistency of the wet cake may crumble to some extent but the wet cake will generally combine particularly when subjected to compression and forming.

Once dried, the dry cake will tend to readily crumble or break apart or crush when a compression or shear force is applied.

The above descriptions are given by way of example only and the exact consistency and form of the wet and dry cake may vary depending on the relatively quantities of carrier, solution and agricultural chemical used as well as moisture content in both the wet and dry cake.

Mixing

Mixing as noted above comprises the process of moving or spreading the herbicide throughout the carrier surface to result in a homogenous spread of herbicide on the carrier surface.

Various techniques may be used for mixing. The speed or intensity of mixing in the inventor's experience does not appear to make any difference to the final product efficacy.

Drying

Drying as noted above may use processes such as dry heat application, freeze drying, vacuum drying, spray drying and so on. By way of example, the water activity of the dry composition after drying may be less than 0.7, or 0.6 or 0.5, or 0.4 or 0.3, or 0.2, or 0.1. The moisture content of the dry composition may be less than 10%, or 9%, or 8%, or 7%, or 6%, or 5% by weight.

Crushing/Milling

Crushing and/or milling the dry composition formed may be completed to produce a final particle size as may be desired for commercial broadcast equipment.

Method of Broadcast of the Dry Composition

In a fourth aspect, there is provided a method of broadcasting of a dry composition with herbicidal activity by:
providing a dry composition comprising a compound with herbicide activity located on a carrier compound and a compound with amphiphilic properties coating at least part or all of the compound with herbicide activity and carrier compound; and
broadcasting the dry composition to: a plant or part thereof; the ground surface surrounding a plant or part thereof; into the ground surrounding a plant or part thereof; and combinations thereof.

Moisture

Optionally, subsequent to broadcast adding moisture to cause elution of the broadcast dry composition to the plant or soil. Moisture may be in the form of irrigation or rain or even exposure to moisture in the soil or evening or morning dew.

Broadcast of the dry composition may be completed without co-application of water.

The inventor has found that morning dew or a small amount of rain e.g. 1 mm per 24 hours may be sufficient for the coating to elute and herbicide migrate from the composition and penetrate the surface of neighbouring vegetation roots or foliar growth.

In-Direct Contact Via Soil Sufficient

It was found that even for herbicides that art suggests require foliar application for effective control, such as glyphosate for example, the present composition was unexpectedly herbicidally effective even if no direct contact with leaves/foliar plant material occurred. Art literature around herbicides like glyphosate teach that the herbicide is rapidly deactivated on contact with soil. As a result, foliar application is the common method of application. Without being bound by mechanism, it appears that the dry composition acts to preserve the herbicide long enough in soil to ensure the herbicide affects vegetation roots. The inventor's found in this case that it was sufficient for the dry composition to be in contact or in very close proximity with any part of the plant (root, leaf, stem) to achieve a herbicidal effect and not just from foliar material application.

The dry composition may provide a localised kill effect.

Single Broadcast

In the above method, broadcasting may occur in one application of dry composition. That is, no additional broadcasts of herbicide or fertilisers are required. As may be appreciated, this represents a considerable advantage over art methods through time and cost savings.

Volume Broadcasted

The volume of dry composition broadcast may be based on the area of growing substrate to be controlled and/or the volume of soil to be conditioned and/or the density of subsequent vegetative growth desired.

Substrate

The ground surface referred to above may be a growing substrate which may be agricultural land.

The ground surface may be flat land, undulating land or hill country.

Hill country may be defined as being land with slopes above 5, or 6, or 7, or 8, or 9, or 10, or 11, or 12, or 13, or 14, or 15, or 16, or 17, or 18, or 19, or 20 degrees. By contrast, flat land or undulating land may be defined as having slopes of 5 degrees or less.

Hill country for the purposes of a temperate climate akin to that seen in New Zealand may be land located at levels below approximately 1000 m above sea level.

Whilst hill country is referred to above, the method may be used on flat land or land with lower slope angles than that described for hill country.

Action Post Broadcast

After the dry composition is applied, through the action of environmental moisture such as rain, dew, humidity, or irrigation for example, the dry composition breaks down or elutes releasing the herbicide which creates a zone around the application area that is free of or has reduced vegetation and wherein the carrier may then subsequently elute to fertilise the soil (assuming the carrier is a fertiliser).

Broadcast Method

Broadcast may be completed via art means e.g. from the ground or by aerial methods and no special handling measures are required.

Coadministration of a Dry Herbicide Composition and Seed

In a fifth aspect, there is provided a method of coadministration of dry composition with herbicide activity and a plant seed by the steps of:
  selecting a dry composition substantially as described above
  selecting plant seed;
  mixing the dry composition and plant seed together as a dry mixture and storing the mixture until ready for use; then
  applying the mixture to the ground surface or drilling the mixture into the ground.

Seed

The seed may be a seed selected from an agricultural crop. The seed may be grass or forage seed. The seeds in this application may be used to extend or re-sow arable land available for grazing by livestock.

The seed may be a seed used in forestry. For example, the seed may be pine seeds and used to plant out an area of land.

The seed may be from a native plant or plants and used to extend native forest land and conservation estate.

Seed Coating

Optionally, the seed may have a coating that substantially covers the seed exterior.

The coating may act to delay seed germination (a common feature to many coatings either by design or a by-product of the coating compounds used).

The coating may comprise at least one art seed coating formulation. Examples may those sold under the trade marks: Superstrike, Prillcote, Agricote, Ultrastrike, Force Field, Gaucho, Poncho, AgroKoat F, AgroKoat A, etc. An advantage of utilising art coatings may be to take advantage of proprietary insecticides and/or fungicides that remove the necessity of adding these compounds separately to the seed coating or seed composition.

The seed coating may have a layer comprising at least one additive or the coating itself may further comprise at least one additive. In one embodiment, the at least one additive may be at least one filler. The filler may be limestone, bentonite, clay, and combinations thereof. The clay may be kaolin.

Pesticidal and Seed or Plant Active Agents

The seed coating if used may optionally comprise at least one pesticidal agent and/or seed or plant active agents. The agents may be selected from: *Rhizobium* bacteria, nutrient components, pesticides, fungicides, buffers, biological compounds to protect a developing seedling, beneficial elements, wetting agents, mould inhibitors, vitamins, cofactors, soil conditioners, plant growth regulators, water absorbents, and combinations thereof.

Dry Composition and Seed Shelf Life

The shelf life of the dry composition and seed may be determined by the shelf life/activity of seeds i.e. the dry composition may have no effect on seed viability even when stored for prolonged periods of time.

Trials by the inventors have shown more than 90% germination of rye grass seed from a dry composition and ryegrass seed combination post storage together. This clearly shows no comprise in germination from mixing with the dry composition described.

This inert nature of the dry composition and seed is somewhat counter intuitive in that the dry composition comprises herbicide that is designed to kill plant growth. Without being bound to mechanism, it appears that the herbicide once coated to form the dry composition cannot interact with seed mixed with the dry composition during storage. Further, elution and herbicide effects appear to occur rapidly enough post broadcast so as to cause surrounding vegetation to be impacted but not impact seed germination. This allows the seed to germinate and grow with less or no competition from existing vegetation thereby allowing the new plant to become established ahead of competitive plant growth.

Dry Composition and Seed Mixtures

The ratio of dry composition to seed in a mixture may be approximately 25-75% by weight of seed to approximately 25-75% by weight of dry composition.

In one embodiment the seed may comprise: 25-75%, or 25%-50% by weight of the dry composition and seed mixture.

Method of Producing a Dry Composition and Plant Seed

In a sixth aspect, there is provided a method of producing a dry composition with herbicidal activity and seed formulated for combined storage and concurrent broadcast, the method comprising the steps of:
  selecting a granulated carrier;
  applying herbicide to the carrier surface;
  drying the sprayed herbicide and carrier;
  coating the dried herbicide and carrier with an amphiphilic compound to form a dry composition; and
  mixing the dry composition with plant seed.

Method of Seeding Land

In a seventh aspect, there is provided a method of seeding land comprising:
providing a volume of plant seed containing herbicide dry composition, the plant seed containing herbicide dry composition comprising:
plant seed;
a dry composition with herbicide activity substantially as described above mixed with the plant seed;
optionally, shipping and storing the mixture of plant seed and dry composition; and
broadcasting the plant seed and dry composition mixture to a growing substrate.

Advantages

As noted above, the composition and related methods of manufacture and use may provide a number of advantages over the art. Whilst not limited to one or more of the following, selected advantages may include:
Providing a dual activity product (or even triple activity product) applied in one application e.g. herbicide and fertiliser (dual) or herbicide, fertiliser and slugicide (triple);
Ease of shipping and storage;
Herbicides are used at rates that are approved and do not exceed Maximum Residue Level (MRL) established by regulatory authorities;
Due to dry application, greater broadcast control occurs with no drift to undesired vegetation or area;
The formulation may be applied at any time including when rainfall is expected. There is no need for rainfastness;
Application may be completed in areas with limited water supplies;
Further, for seed and dry composition mixtures:
The ability exists form using the dry composition to propagate large numbers of seeds over a wide area and in challenging locations;
There may be no post broadcast maintenance unlike in the art when seeds may be applied and weeding needed post broadcast;
There is no need to separately apply herbicide to a site pre seed broadcast;
Labour and transport costs may be minimised through a reduction in the number of applications needed due to co-administration;
Excellent seed propagation/germination rates result from the seed and dry composition mixture;
The mixture is anticipated to be storage stable for 2 or more years;
Avoidance of dusting issues or loss of seed coating during storage and handling;
Avoidance of drift such as the issue of spray drift seen for spray solutions;
Avoidance of run off of herbicide solution into waterways.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

BRIEF DESCRIPTION OF THE DRAWINGS

Further aspects of the composition and related methods of manufacture and use will become apparent from the following description that is given by way of example only and with reference to the accompanying drawings in which:

FIG. 7A being a photo and FIG. 7B being a line drawing of the photo image;

WORKING EXAMPLES

The above described composition and related methods of manufacture and use are now described by reference to specific examples.

Example 1

To demonstrate the layered nature of the composition described herein, a dry granular composition was manufactured and images prepared.

Figure 1:
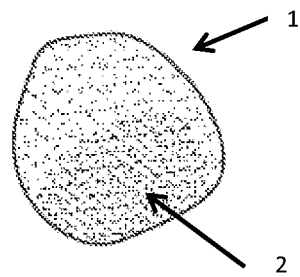
FIG. 1 shows an enlarged drawing of a dry granule composition manufactured according to the above description with part of the exterior removed to show the interior structure.
Figure 2:
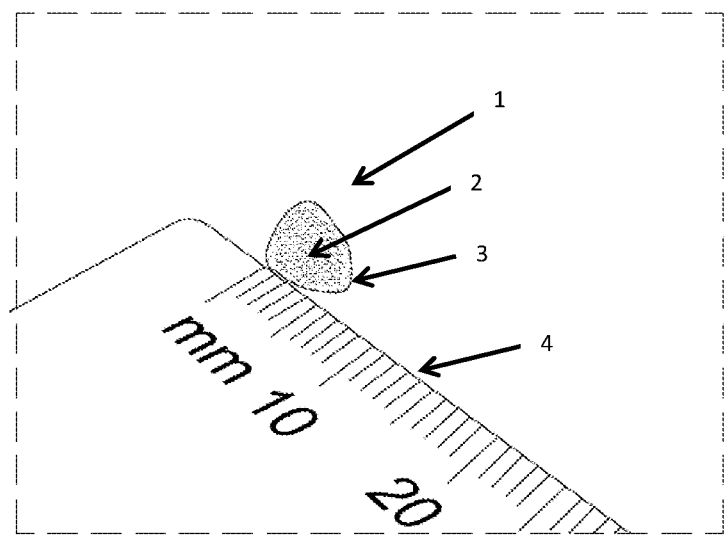
FIG. 2 shows a further drawing of a dry granule composition manufactured according to the above description with part of the exterior removed to show the interior structure, in this example also with a ruler included to provide scale to the granule size.

FIG. 1 and FIG. 2 show drawings of a dry granule composition arrow 1 manufactured according to the above description with part of the exterior removed to show the interior structure arrow 2. In these Figures, the carrier 2 is super phosphate and the herbicide is 2,4-D Ester. As shown in the images, the herbicide layer 3 is located on and not substantially mixed into or homogenous with the fertiliser/carrier 2. A ruler 4 is included in FIG. 2 to provide a scale to the granule 1 size.

Figure 3:
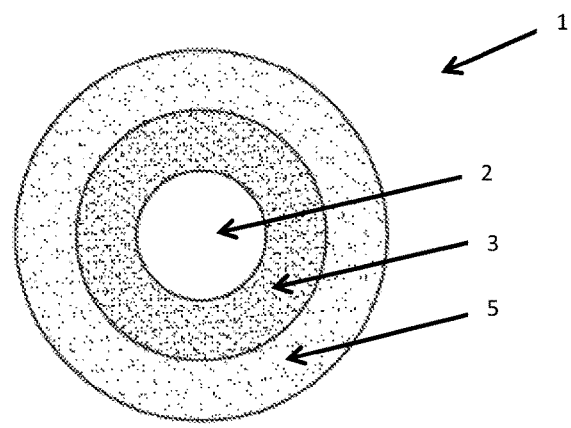
FIG. 3 shows a schematic drawing of the composition structure with the different layers exaggerated for explanation purposes.

FIG. 3 shows a schematic drawing of the composition 1 in an exaggerated form to show the distinct layers more clearly. As shown in FIG. 3, the granule 1 structure comprises multiple layers with minimal if any homogeneity. The inner layer comprises a carrier 2, in the example being a fertiliser, then a herbicide layer 3 and then on the exterior, an amphiphilic compound 5 and other optional compounds used to form the outer layer e.g. adhesives or surfactants.

While a granule shape is illustrated in FIGS. 1-3, prills, ovoid shapes or other shaped compositions may also be used and reference to a granule is not limiting.

Example 2

In this example selected dry compositions are illustrated comprising different herbicides (and combinations of herbicides), different carriers (and combinations of carriers) and different coatings and the weight ranges for each.

The examples below should be understood only as guideline formulations as actual amounts of herbicides included may vary, sometimes significantly outside the specified values below.

Formulation 1

| Ingredient | Action | Amount wt. % |
| --- | --- | --- |
| Glyphosate soluble concentrate 600 g/L | Herbicide | 0.5-3.5% |
| Cocoamidopropyl dimethyl amine surfactant | Surfactant | 1% |
| Lecithin | Coating | 1.5% |
| Ammonium sulphate | Carrier | To 100% |

Formulation 2

| Ingredient | Action | Amount wt. % |
| --- | --- | --- |
| 2,4-D Amine 400 g/L soluble concentrate | Herbicide | 1.0-5.0% |
| Antarox L64 | Surfactant | 1.0-5.0% |
| Ammonium Phosphatidyl Rapeseedate | Coating | 0.5-1.0% |
| Superphosphate Fertiliser | Carrier | To 100% |

Formulation 3

| Ingredient | Action | Amount wt. % |
| --- | --- | --- |
| 2,4-D Ethylhexyl Ester 680 g/L emulsifiable concentrate | Herbicide | 2.0-10.0% |
| Pluronic PE 6200 | Surfactant | 0.5-0.75% |
| Hydrogenated phosphatidylcholine | Coating | 1.0-2.0% |
| Sodium lignosulphonate | Adhesive | 2.0-3.0% |
| Urea fertiliser | Carrier | To 100% |

Formulation 4

| Ingredient | Action | Amount wt. % |
| --- | --- | --- |
| Picloram 100 g/L/ Triclopyr 300 g/L emulsifiable concentrate | Herbicide | 0.05-2.0% |
| Polysorbate 80 | Surfactant | 0.25-0.5% |
| Lecithin | Coating | 1.0-2.5% |
| Morwet D425 | Surfactant | 0.5-1.5% |
| Lime granulated | Carrier | To 100% |

Formulation 5

| Ingredient | Action | Amount wt. % |
| --- | --- | --- |
| Clopyralid 300 g/L soluble concentrate | Herbicide | 0.25-3.0% |
| Geronol CF/AS 30 | Surfactant | 0.5-2.0% |
| Lysophosphatidyl ethanolamine | Coating | 2.0-3.0% |
| Magnesium oxide | Carrier | To 100% |

Formulation 6

| Ingredient | Action | Amount wt. % |
| --- | --- | --- |
| Flumetsulam 800 g/kg WDG dispersion in water | Herbicide | 0.01-1.0% |
| Lecithin | Coating | 0.25-1.0% |
| Magnesium sulphate heptahydrate | Carrier | To 100% |

Formulation 7

| Ingredient | Action | Amount wt. % |
|---|---|---|
| MCPB 375 g/L/MCPA 25 g/L soluble concentrate | Herbicide | 0.1-2.0% |
| Geronol CF/AR | Surfactant | 0.25-1.0% |
| Hydrogenated phosphatidyl choline | Coating | 0.2-1.0% |
| Lime granulated | Carrier | To 100% |

Example 3

In this example, the avoidance of dust formation from the dry composition was tested.

The dustiness of formulated products was tested according to the CIPAC, MT 44 method. Results from this test identified that all tested formulations (as described in Example 2 above) are practically dust free.

Figure 4:
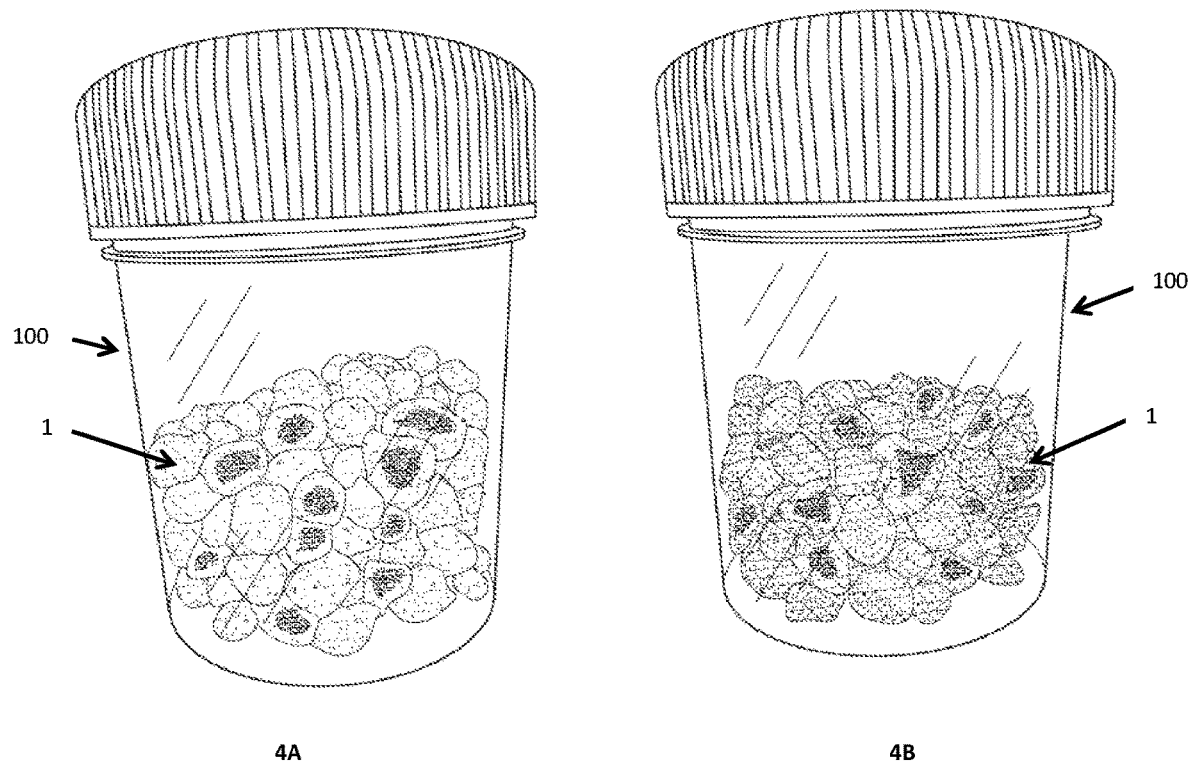
FIG. 4 shows images of a formulation sample before shaking (left, 4A) and after shaking (right, 4B) in a dust formation test showing virtually no dust formation.

A visual observation was also performed. 20 grams of dry granules 1 manufactured from formulation 1 was placed in a clear jar 100 and shaken vigorously for 30 seconds to generate dust. No significant dust was observed. Photos before shaking (left, 4A) and after shaking (right, 4B) are shown in FIG. 4 with the granules 1 moved around in the jar 100 but no dust formed.

These findings support the fact that the dry composition does not produce dust and hence avoids or at least minimises handling issues associated with chemical dusts.

Example 4

As noted above, the dry composition may be formulated in different ways to influence the elution rate.

The basic dry composition coating provides one rate of elution. This rate of elution can be altered using additives to speed up or slow the rate of elution.

The delayed mode of action can be achieved by blending top outer layer with controlled release substances, for example brown coal, or by increasing the thickness of the outer layer and/or inclusion of water insoluble or semi-soluble substrates.

Formulation 8—Rapid Release of Soluble 2, 4-D Amine

| Ingredient | Action | Amount wt. % |
|---|---|---|
| 2,4-D Amine 400 g/L soluble concentrate | Herbicide | 1.0-5.0% |
| Antarox L64 | Coating additive | 1.0-5.0% |
| Ammonium Phosphatidyl Rapeseedate | Coating | 0.5-1.0% |
| Magnesium sulphate heptahydrate | Carrier | To 100% |

Formulation 9—Delayed Release of 2,4-D Amine

| Ingredient | Action | Amount wt. % |
|---|---|---|
| 2,4-D Amine 400 g/L soluble concentrate | Herbicide | 1.0-5.0% |
| Antarox L64 | Coating additive | 1.0-5.0% |
| Ammonium Phosphatidyl Rapeseedate blend with brown coal | Coating | 2.0-5.0% |
| Superphosphate Fertiliser | Carrier | To 100% |

Example 5

As described above, the dry composition may be broadcast via different methods. The inventors have found that almost any application where dry fertiliser would be applied in the art, may also be appropriate for the dry composition described herein be that by ground or by air application. An advantage of the dry composition described particularly for aerial broadcast is the absence of drift that is a significant issue for spray application of herbicides.

The examples below show applied product dispersion on vegetation, the dry composition applied on flat land (FIGS. 5A (photo) and 5B (line drawing) and FIG. 6A (photo) and FIG. 6B (line drawing)) and hill country (FIGS. 7A (photo) and 7B (line drawing)).

Figure 5A:
FIG. 5A and FIG. 5B show granules of product dispersed on vegetation on flat land post rain fall, FIG. 5A being a photo and FIG. 5B being a line drawing of the photo image.
Figure 5B:
Figure 6A:
FIG. 6A and FIG. 6B show granules of product dispersed on vegetation applied on flat land, FIG. 6A being a photo and FIG. 6B being a line drawing of the photo image.
Figure 6B:
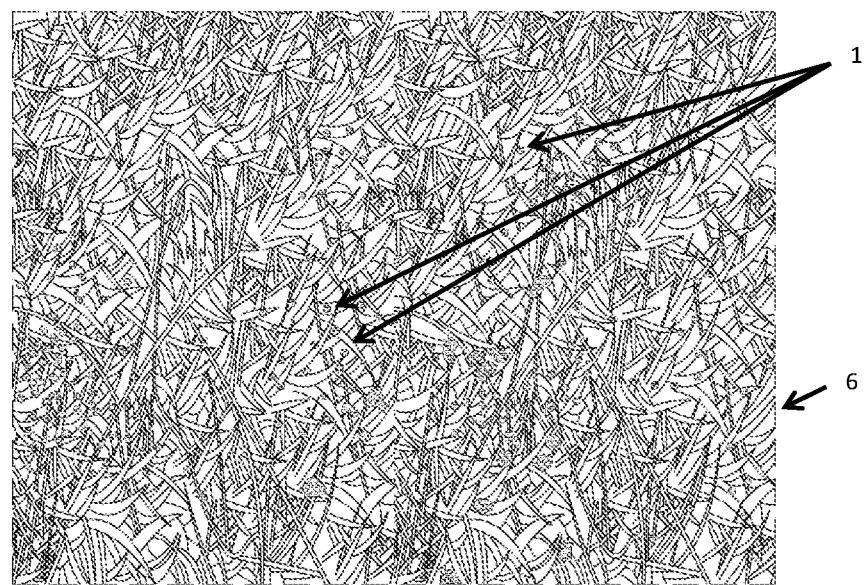
Figure 7A:
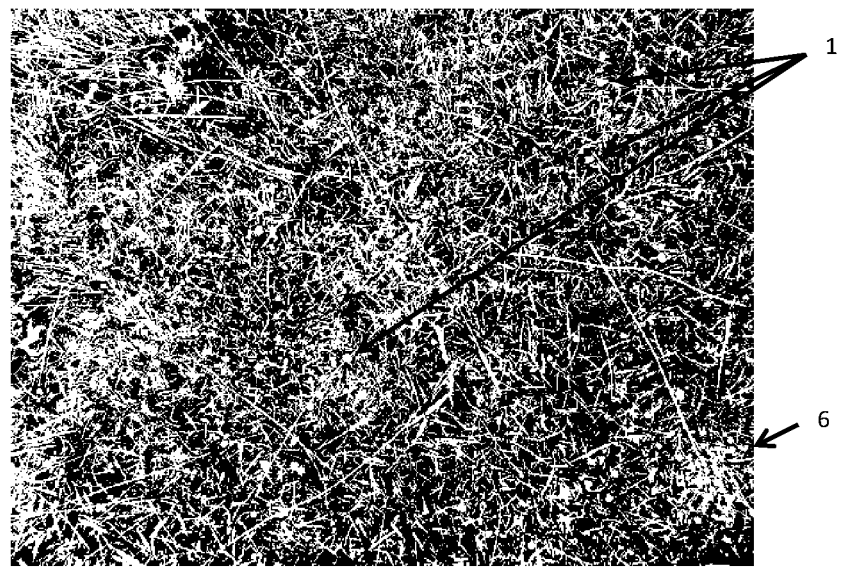
FIG. 7A and FIG. 7B show granules of product dispersed on vegetation applied on hill country.
Figure 7B:
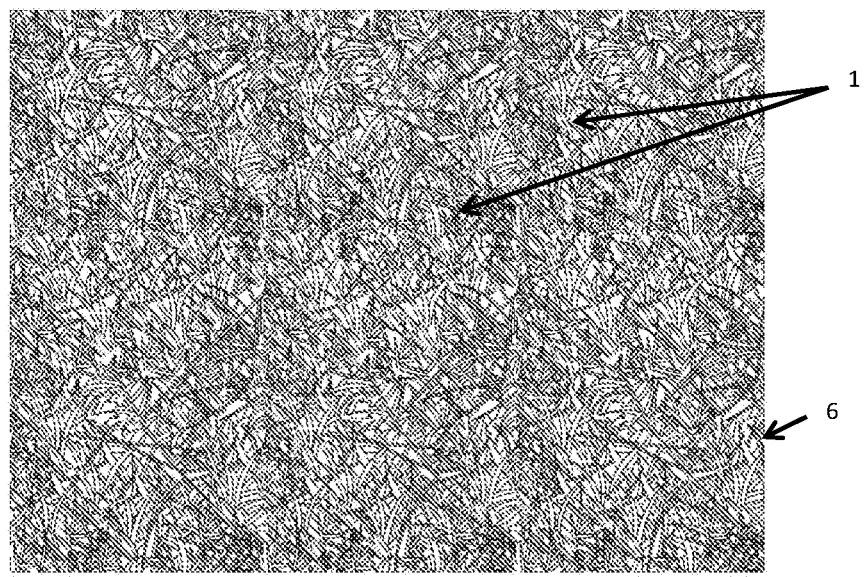

As shown in FIGS. 5A, 5B, 6A and 6B, the dry composition granules 1 are merely spread over the ground or vegetation 6. FIGS. 5A and 5B in particular shows how the granules 1 lose their shape and disperse post broadcast and rain. Comparing the dispersion between FIG. 6A, 6B on the flat and FIG. 7A, 7B on hill country, it can be seen that the act of broadcasting the dry composition 1 is similar despite different terrain and the resulting granule 1 distribution is the same—that is, there is no run off of granules 1 or uneven distribution of granules 1 from the foliage 6 irrespective of the ground being sloped or flat illustrating that the dry composition 1 can be applied to either terrain type.

Figure 8A:
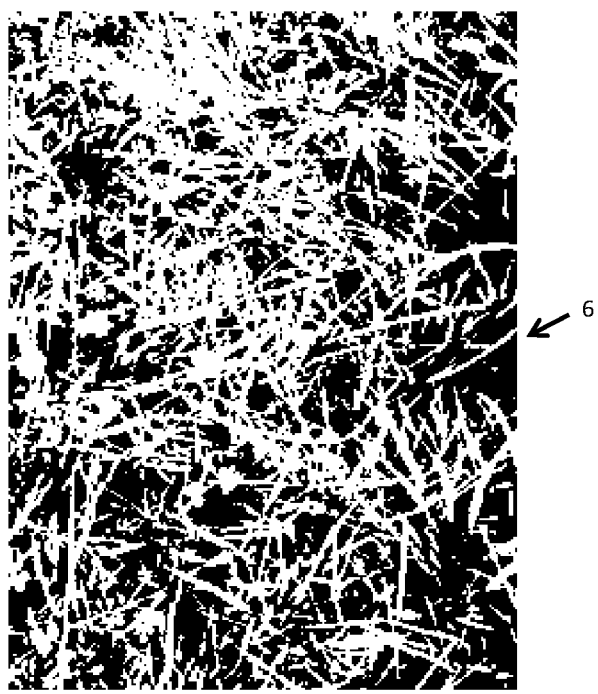
FIG. 8A and FIG. 8B is a photograph (8A) and line drawing (8B) of the photo of FIG. 8A on day 0 post soil application of a dry composition granule, in this case applied by dropping the granules into small holes inserted into the soil and then covering over the holes.
Figure 8B:
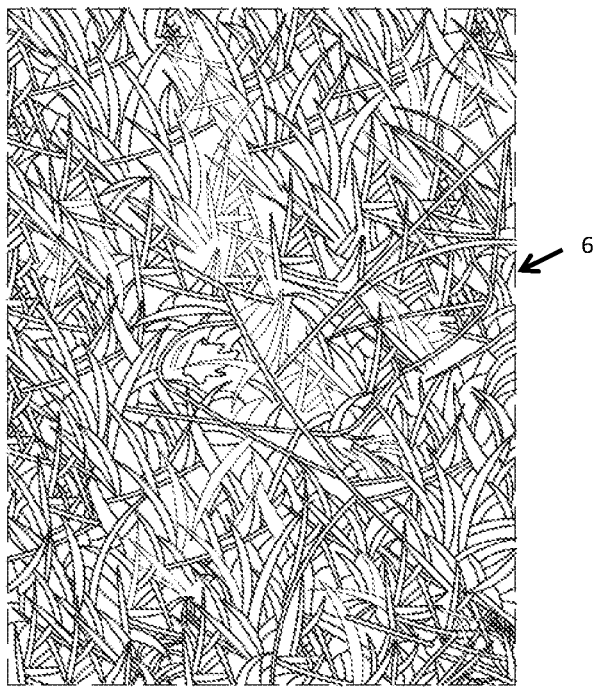
Figure 9A:
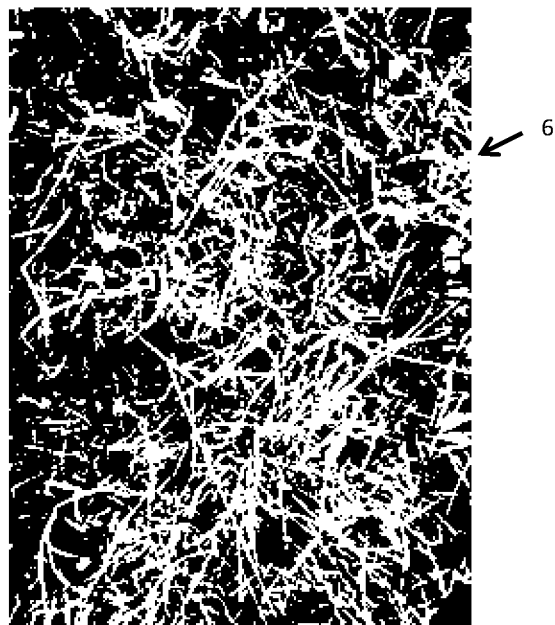
FIG. 9A and FIG. 9B is a photograph (9A) and line drawing (9B) of the photo of FIG. 9A on day 14 post soil application of the dry composition granule described above.
Figure 9B:
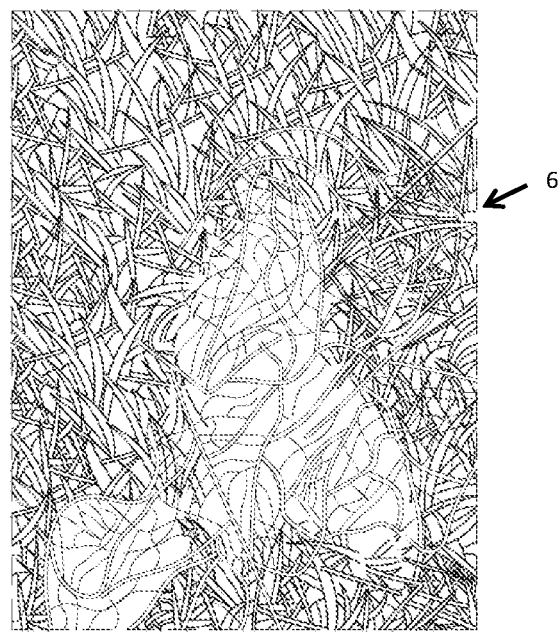
Figure 10A:
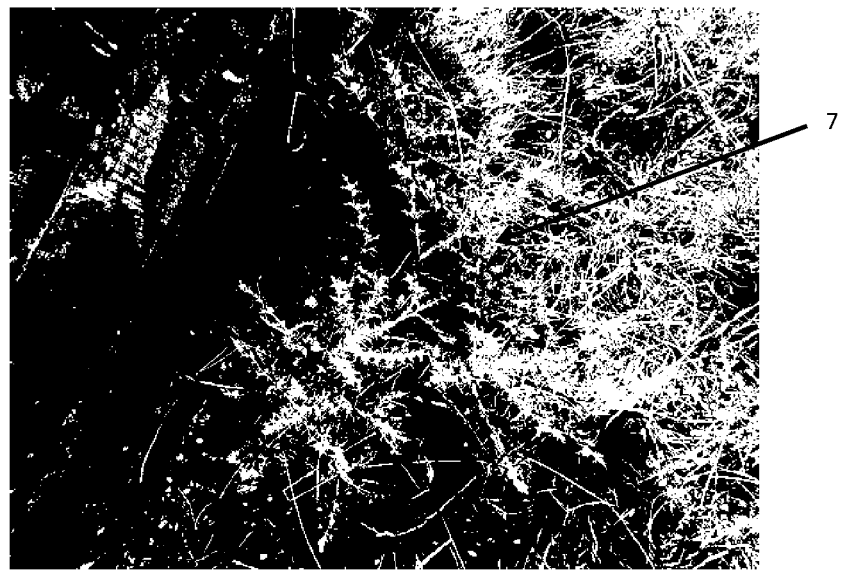
FIG. 10A and FIG. 10B is a photograph (10A) and line drawing (10B) of the photo on day 1 post broadcast of a 2,4-D ester herbicide containing dry composition granule applied to the area around the weed Californian thistle.
Figure 10B:
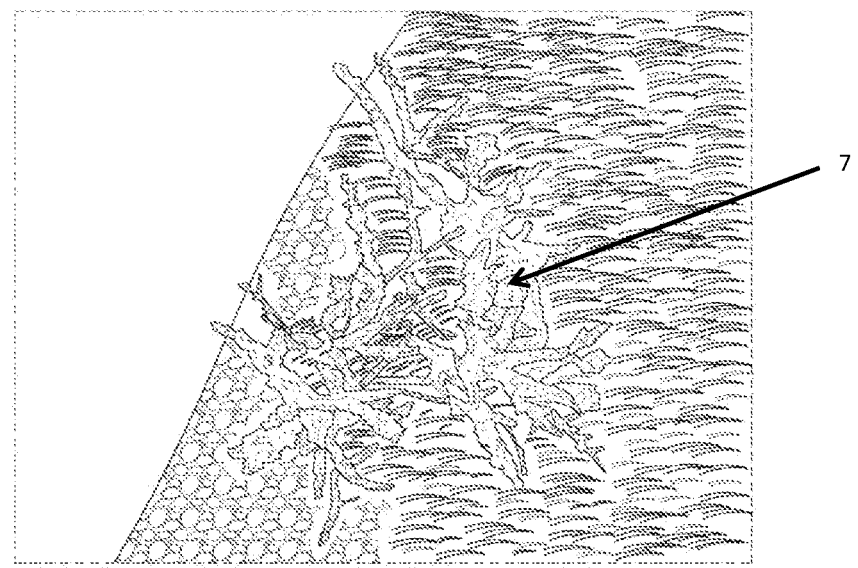
Figure 11A:
FIG. 11A and FIG. 11B is a photograph (11A) and line drawing (11B) of the photo on day 14 post broadcast of a 2,4-D ester herbicide containing dry composition granule applied to the area around the weed Californian thistle.
Figure 11B:
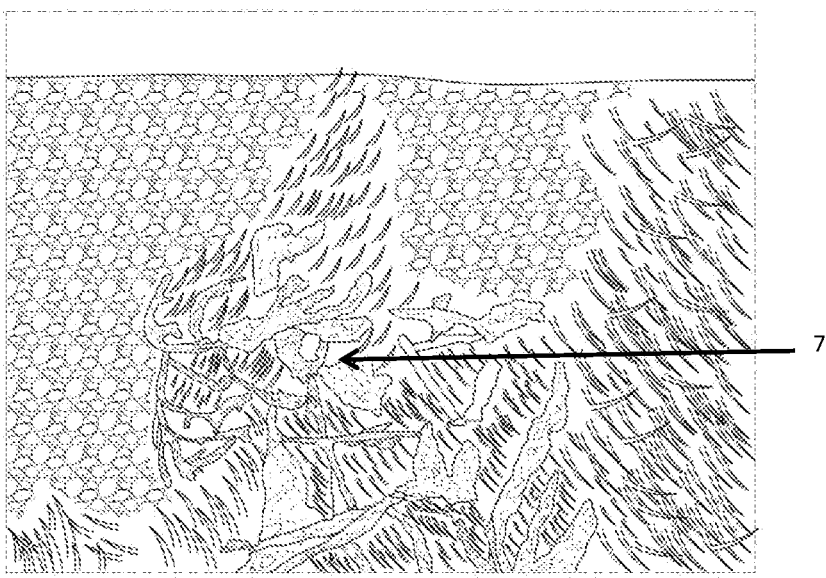
Figure 12A:
FIG. 12A and FIG. 12B is a photograph (12A) and line drawing (12B) of the photo illustrating vegetation on day 6 post broadcast of a 2,4-D amine herbicide containing dry composition showing significant curling of the vegetation.
Figure 12B:
Figure 13A:
FIG. 13A and FIG. 13B shows a photograph (13A) and line drawing (13B) illustrating foliage on day 1 post broadcast to the foliage of glyphosate containing dry composition granules.
Figure 13B:
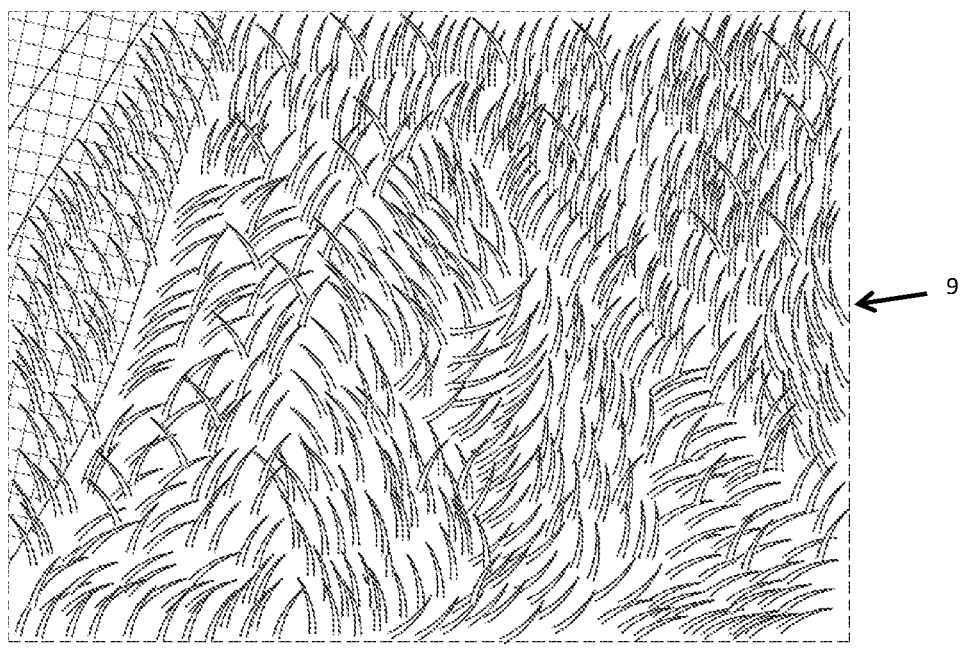
Figure 14A:
FIG. 14A and FIG. 14B shows a photograph (14A) and line drawing (14B) of the photo illustrating foliage on day 15 post broadcast to the foliage of glyphosate containing dry composition granules.
Figure 14B:
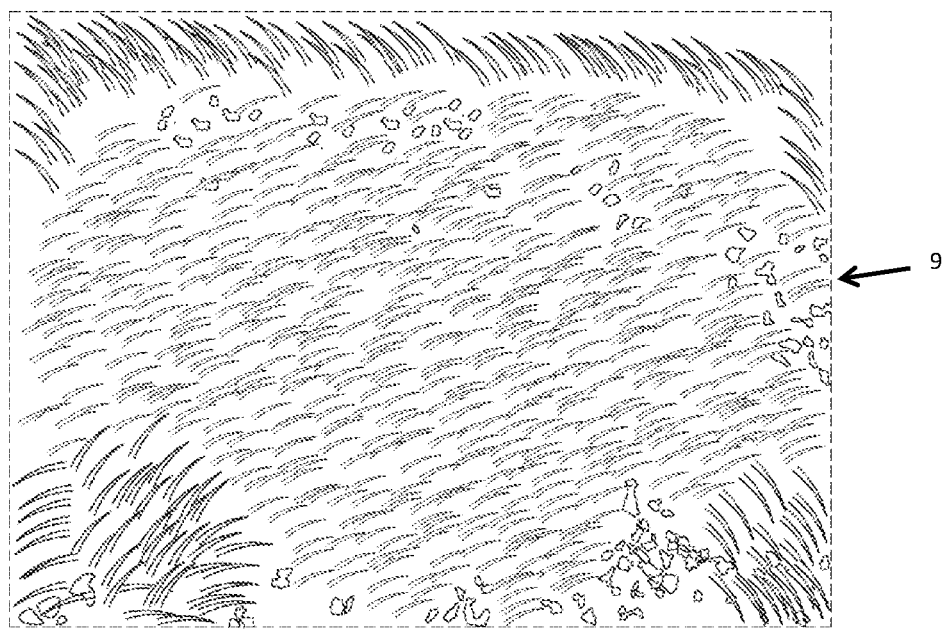

As noted in the above description, the inventors unexpectedly identified that the dry composition could be applied into soil and still achieve herbicide effects. Art would suggest the herbicide is deactivated by contact with soil hence the inventor's findings were a surprise. To illustrate this effect, dry composition was dropped into small holes made in the ground about a pasture sample area using a knife and dry composition then covered over. FIG. 8 shows the pasture sample area at day 0 i.e. when the dry composition was knifed into the ground. As can be seen in FIG. 8A and FIG. 8B, the pasture 6 looks healthy and is green. FIGS. 9A and 9B shows the same pasture 6 sample area 14 days post soil application and the pasture 6 is brown and largely dead or dying showing root herbicide activity.

Example 6

As described above, the dry composition has a number of shipping/storage advantages versus liquid herbicide concentrates and products.

In particular, using glyphosate herbicide as an example, the described dry composition is:

More environmentally friendly compared to a liquid glyphosate formulation in the event of an accident spill. It is much easier to clean up a dry composition (e.g. sweep or vacuum) compared to clean up of liquid formulations. Liquid formulations may find their way into water ways or permeate a ground surface rapidly killing vegetation in an unintended and non-reversible manner;

A single application of fertiliser and herbicide together. This dual application provides cost savings around labour and broadcast efficiency.

Water saving—no water is required to dilute/dissolve herbicide on broadcast unlike liquid herbicide concentrates. The dry composition described may therefore be a better option for broadcast to areas with irrigation water restrictions or where water is a limiting factor;

No spray drift—unlike solutions and suspensions of herbicides where micro-droplets can be carried outside the application area by wind causing damage to non-target vegetation;

More controlled application which reduces the chances of accidental contamination of ground water.

Example 7

The manufacturing process for the dry composition can be described as a simple process that may comprise the following steps:

Selecting the carrier and herbicide to be applied;

Spraying the herbicide to a carrier surface at a rate comparable to an accepted liquid rate per hectare to form a granule with herbicide;

Drying the granules with herbicide sprayed as a layer thereon (optional);

Coating the granules with an outer layer;

Drying the coated carrier and granule with herbicide;

In the case of emulsifiable concentrates, the above drying is not necessarily required and instead, the outer layer may include an "oil" absorbing agent.

The drying step or steps can be performed by currently available techniques, for example hot air drying, vacuum drying, fluidized-bed drying or freeze drying.

The following are examples of manufacture of granulated product for if soluble concentrates and emulsifiable concentrates are used.

Formulation 10—A Soluble Concentrate

| Ingredient | Action | Amount wt. % |
|---|---|---|
| Glyphosate soluble concentrate 600 g/L | Herbicide | 0.5-3.5% |
| Cocoamidopropyl dimethyl amine surfactant | Coating additive | 1% |
| Lecithin | Coating | 1.5% |
| Ammonium sulphate | Carrier | To 100% |

Manufacturing Process:

1. Ammonium sulphate in amount to provide 300-350 kg/ha of ammonium sulphate is loaded into a paddle mixer;
2. The required amount of glyphosate soluble concentrate (to provide 1000-1440 g acid equivalent/ha of glyphosate) is sprayed on the ammonium sulphate in order to ensure all granules of carrier are covered by herbicide. This is achieved by controlling the speed of spray and speed of mixing;
3. The wet granules are dried until the moisture content is below then 2.5 wt. %;
4. The dried granules are placed in the paddle mixer and sprayed with a dispersion of lecithin in cocamidopropyl dimethyl amine water solution.
5. The granules are dried to a moisture content below 1 wt. %.

Formulation 11—An Emulsifiable Concentrate

| Ingredient | Action | Amount % |
|---|---|---|
| 2,4-D Ethylhexyl Ester 680 g/L emulsifiable concentrate | Herbicide | 2.0-10.0% |
| Pluronic PE 6200 | Surfactant | 0.5-0.75% |
| Hydrogenated phosphatidylcholine | Coating | 1.0-2.0% |
| Sodium lignosulphonate | Coating additive | 2.0-3.0% |
| Urea fertiliser | Carrier | To 100% |

Manufacturing Process:

1. Urea fertiliser in amount to provide 80 kg/ha urea is loaded into a paddle mixer;
2. A commercial formulation of 2,4-D ethylhexyl ester in amount sufficient to provide 1800-2500 g/ha 2,4-D acid is sprayed on the urea until all granules are fully covered by the herbicide;
3. The granules covered with herbicide are sprayed with a dispersion of hydrogenated phosphatidylcholine in an aqueous solution of EO/PO block co-polymer (Pluronic PE 6200);
4. The wet granules are dried to remove moisture and placed in the mixer;
5. Sodium lignosulphonate is added until all urea granules are covered with powder and until the granules no longer have an oily appearance.

Example 8

Examples are now provided illustrating the efficacy of the dry composition when applied to the foliage of a plant and when applied to the ground about a plant.

In a first experiment, 2,4-D ester herbicide containing dry composition granules were applied to the ground area around the weed Californian thistle to test efficacy and measurements of herbicidal effect taken thereafter. FIG. 10A is a photograph and FIG. 10B a line drawing of the Californian thistle 7 on day 1 post broadcast and FIG. 11A is a photograph and FIG. 11B of the Californian thistle 7 on day 14 post broadcast. As shown, weed growth has stopped by day 14 with the weed 7 substantially killed. Full control of the weed 7 was achieved within 3 weeks of application (not shown).

In a second experiment, 2,4-D amine herbicide containing dry composition granules were applied to foliage of vegetation to test herbicidal effects. FIG. 12A and FIG. 12B illustrate the vegetation 8 on day 6 post broadcast showing significant curling of the vegetation 8 being the first sign of weeds being affected by herbicide. Inventor observations post day 6 confirmed the dry composition successfully killed the vegetation 8 growth.

In a third experiment, glyphosate containing dry composition granules were applied to test plant foliage. The glyphosate in the dry composition was present at a rate of 1200 grams acid equivalent/ha. FIG. 13A and FIG. 13B shows the foliage 9 on day 1 post broadcast while FIGS. 14A and 14B shows the foliage 9 on day 15 post broadcast. The day 15 Figures shows a significant browning of the vegetation 9 and obvious kill effect from the dry composition (not shown). The inventors noted again that full control kill of the vegetation 9 was achieved by Day 21.

Example 9

Examples of seed and dry composition mixtures are now described.

The actual combination of herbicide/grass seed mix depends on the requirements, preference and region; however for example only, the following combinations are described:

Mixture 1

| Component | Amount wt. % |
| --- | --- |
| Grass seed mix (perennial ryegrass, cocksfoot, tall fescue mix) | 10% |
| Glyphosate based granulated dry composition | 90% |

Mixture 2

| Component | Amount wt. % |
| --- | --- |
| Grass seed mix (red clover, cocksfoot, browntop, kikuyu) | 75% |
| 2,4-D ethylhexyl ester based granulated dry composition | 25% |

Mixture 3 a. Coated seed composition:
  Grass seeds 50%
  Seed coating 50% *
    * Coating consists of: 93.9% lime, 2% Methocel K25M as solution, 0.8% molybdenium, 2.7% *Rhizobium*, 0.3% Apron fungicide, Lecithin 0.5%
b. Herbicidal dry composition:
  Ammonium sulphate 89% (carrier)
  600 g/L Glyphosate soluble concentrate commercial product 10% (herbicide)
  Lecithin 1% (coating)

To form the final seed composition suitable for application, composition a is mixed with composition b as 50:50% by weight mixture.

Mixture 4 a. Coated seed composition:
  Grass seeds 50%
  Seed coating 50%*
    * Coating consists of: 1.66% AgroKoat A, 0.72% imidacloprid, 1.3% molybdenium, 48.16% lime, 47.66% kaolin, Cocamidopropyl betaine 0.5%
b. Herbicidal dry composition:
  Ammonium sulphate 89% (carrier)
  600 g/L Glyphosate soluble concentrate commercial product 10% (herbicide) Lecithin 1% (coating)

To form the final seed composition suitable for application, composition a is mixed with composition b as 50:50% by weight.

Mixture 5 a. Coated seed composition:
  Grass seeds 50%
  Seed coating 50%*
    * Coating consists of: 1.4% Primal AC234, 0.5% methylcellulose 4000 cPs, 0.24% Thiram fungicide, 1.3% molybdenium, 46.78% lime, 48.28% kaolin. Sodium dodecyl sulphate 1.5%
b. Herbicidal dry composition:
  Commercial N, P, K Fertiliser 79% (carrier)
  2,4-D amine 400 g/L soluble concentrate commercial product 19% (herbicide) Lecithin 2% (coating)

To form the final seed composition suitable for application, composition a is mixed with composition b as 50:50% by weight.

Example 10

In this example, a method is provided to produce a combination seed and dry composition mixture.

The combination of seed and dry herbicide can be presented as simple steps as follow:
  Selecting the single or multiple plants seeds and amounts required for specified area treatment;
  Choosing the granular composition based on herbicide, fertiliser requirements for specified in amounts required to treat the specified area;
  Mixing the seeds and herbicide composition.

No special treatment or separation is needed between the seed and dry composition for transport, storage or broadcast.

Example 11

In this example, a trial is described where seed/dry composition mixtures were co-administered and the resulting localised kill effect and subsequent seed germination rates described.

A mix of ryegrass seeds and glyphosate granular composition was prepared and an area of ground vegetation was treated to provide 350 kg ammonium sulphate and 1440 g glyphosate per ha.

Figure 15A:
FIG. 15A and FIG. 15B shows a photograph (A) and line drawing (B) of an area of vegetation before a ryegrass seed and dry composition mixture was applied to the area.
Figure 15B:
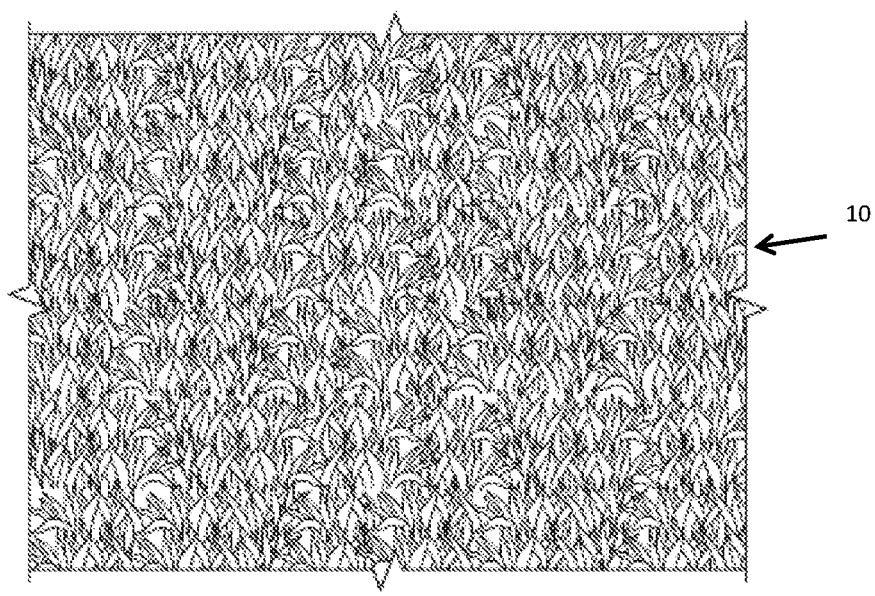
Figure 16A:
FIG. 16A and FIG. 16B shows a photograph (A) and line drawing (B) of the same area of vegetation shown in FIG. 13, 12. Days post application.
Figure 16B:
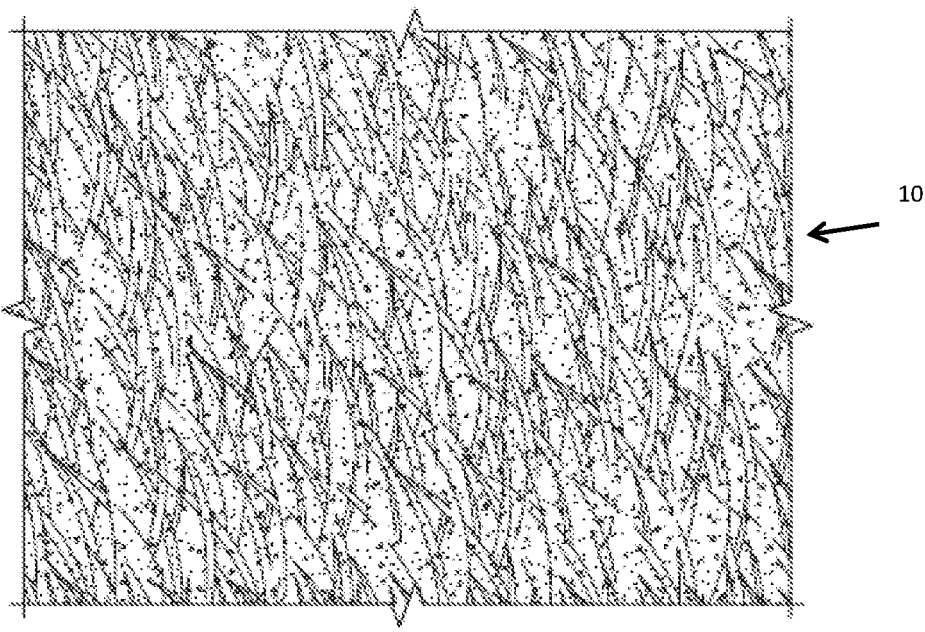
Figure 17A:
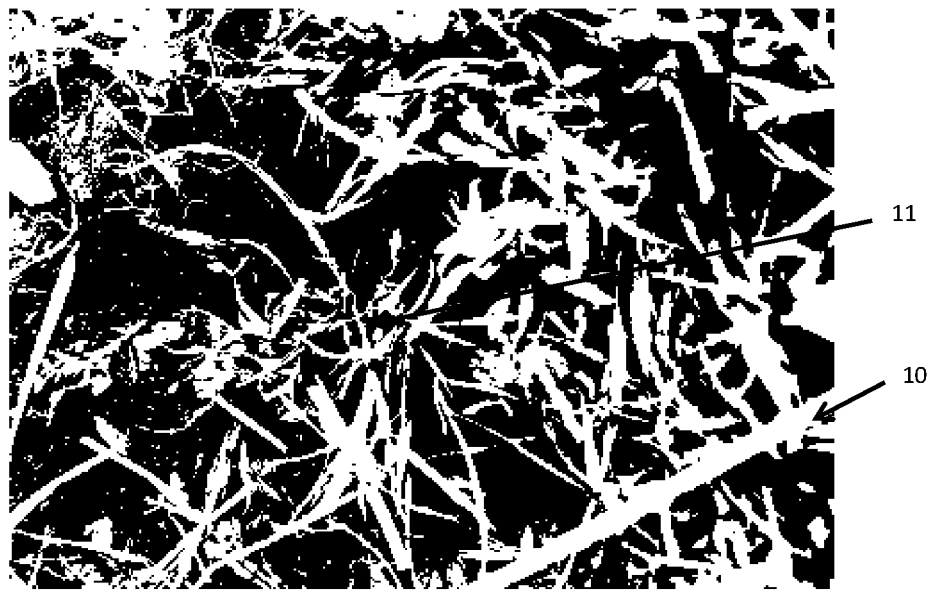
FIG. 17A and FIG. 17B is a detail view photograph (A) and line drawing (B) of the area of FIGS. 16A and 16B to illustrate the new grass germination that occurred by day 12 amongst the killed off pre-existing vegetation.
Figure 17B:
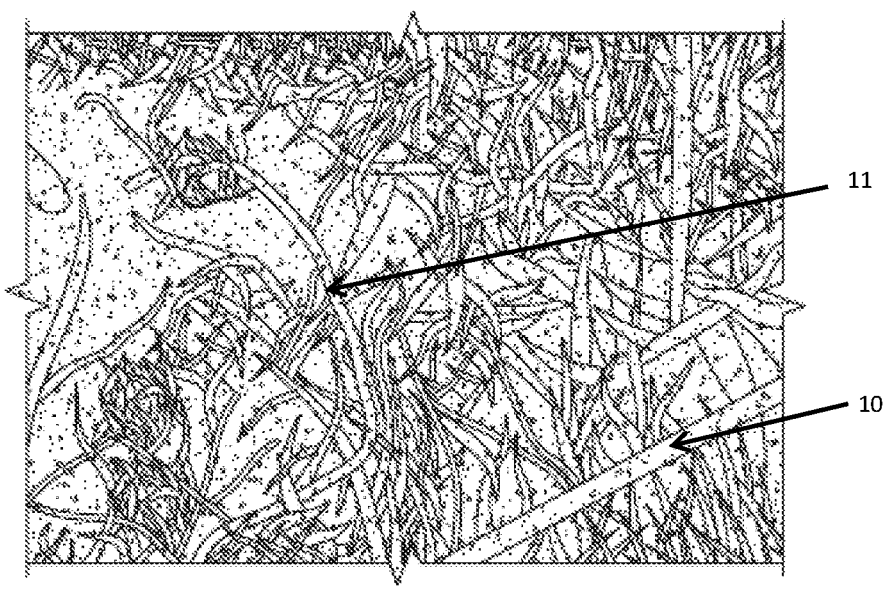
Figure 18A:
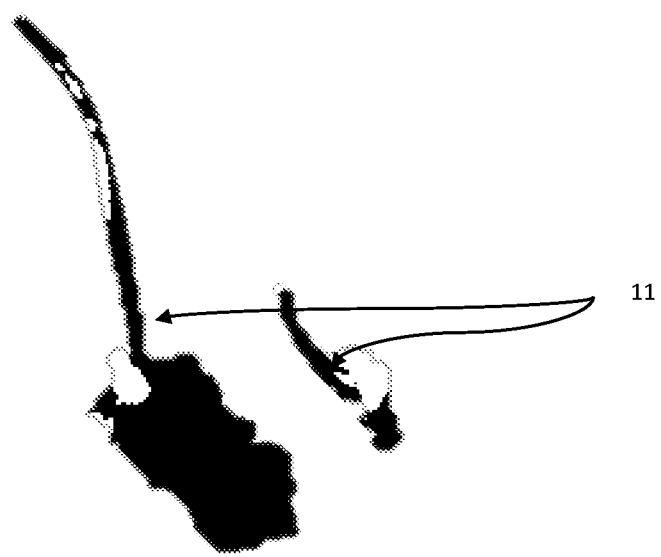
FIG. 18A and FIG. 18B is a photograph (A) and line drawing (B) of a further detail view of the area of FIGS. 16A and 16B to illustrate the new grass germination that occurred by day 12 amongst the killed off pre-existing vegetation.
Figure 18B:
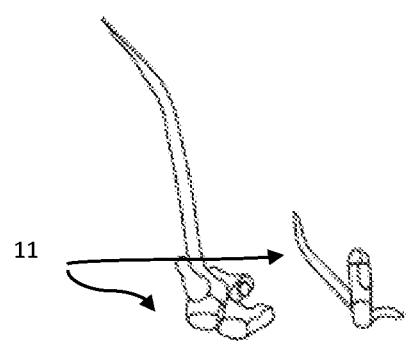
Figure 19A:
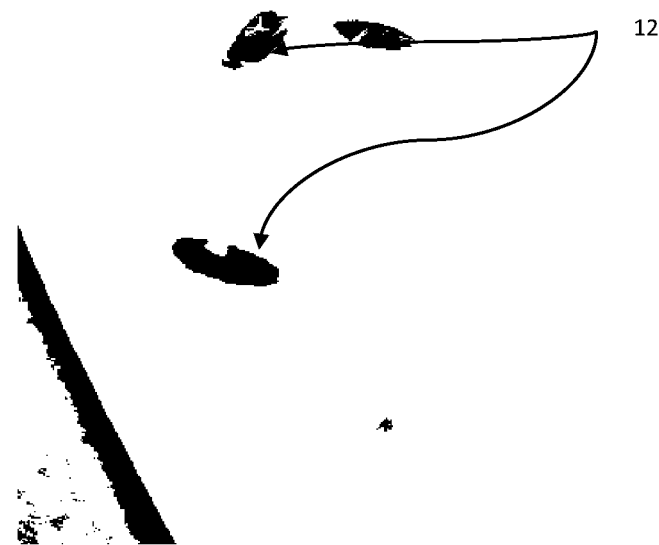
FIG. 19A and FIG. 19B shows a photograph (A) and line drawing (B) of germinated seeds from a first trial of seeds and dry composition mixture.
Figure 19B:
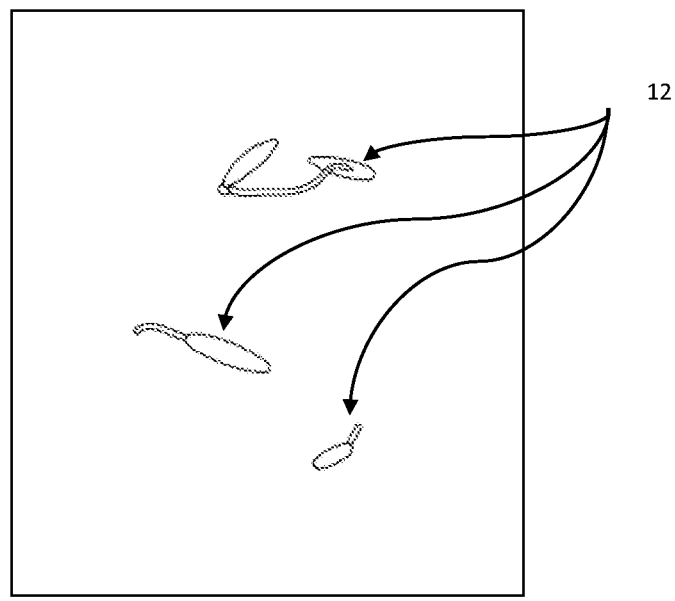
Figure 20A:
FIG. 20A and FIG. 20B shows a photograph (A) and line drawing (B) of a further view of germinated seeds from a first trial of seeds and dry composition mixture.
Figure 20B:
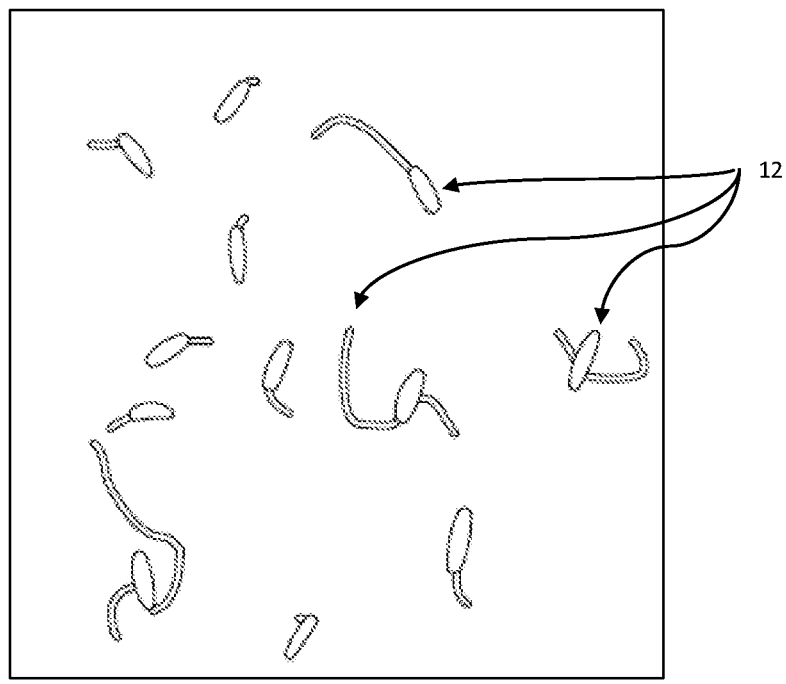

FIGS. 15A and 15B shows the area of vegetation 10 before the above dry composition was applied and FIGS. 16A and 16B shows the same area of vegetation 10, 12. Days post application. FIGS. 17A and 17B and FIGS. 18A and 18B are detail views of the area of FIGS. 16A and 16B to illustrate the kill effect against old grass 10 and the new grass germination 11 that occurred by day 12 amongst the killed off pre-existing vegetation 10.

Example 12

In this example, shelf life stability experiments for both the dry composition alone and the seed and dry composition together are illustrated to demonstrate storage capability.

In this trial, a glyphosate based dry composition was subjected to stability evaluation according to FAO recommendations The results presented in the Table below.

| Parameter | Method | Initial | After storage at 54° C. for 14 Days |
| --- | --- | --- | --- |
| Appearance | Visual | Slightly green granules | Slightly green granules |
| Glyphosate content | AOAC 996.12 | 41.2 g/kg | 40.9 g/kg |

-continued

| Parameter | Method | Initial | After storage at 54° C. for 14 Days |
|---|---|---|---|
| Persistent foam 60 mL max | CIPAC, MT47.3 | 15 mL | 14 mL |
| Residue 2% max on 75 µm sieve | CIPAC, MT 179.1 | ND | ND |
| Essentially non-dusty | CIPAC, MT 171.1 | Complies | Complies |

The data presented in the Table 1 is sufficient to nominate 2 years shelf life of formulation.

Example 13

In this example, a controlled study was undertaken in laboratory to evaluate if pre-emergent herbicide from a dry composition described herein, (in this example using glyphosate as the herbicide), has any negative effect of seed germination and to evaluate the germination rate from a dry composition and seed mixture.

The glyphosate dry composition was mixed with ryegrass seeds and stored for 2 months in general storage area. Twenty-five seeds were placed between multiple layers of paper towels and saturated with water. The paper towels containing seeds were placed between two sheets of aluminum foil and the sides crimped. After 5 days at room temperature the seeds were removed and evaluated for germination and germination rate. To evaluate if germination rate has changed, a control group of seed only was included in the same study (seeds without dry composition as is commercially available).

It was found that germination rate for both types of seeds (with and without dry composition) was equal i.e. 18 seeds from the trial seeds mixed with dry composition germinated and 19 control seeds (no dry composition) germinated.

FIGS. 19A and 19B and FIGS. 20A and 20B show views of the germinated seeds 12 from the trial seeds and dry composition mixture illustrating germination that occurred.

Figure 21A:
FIG. 21A and FIG. 21B shows a photograph (A) and line drawing (B) of a view of germinated seeds from a second trial of seeds and dry composition mixture.
Figure 21B:
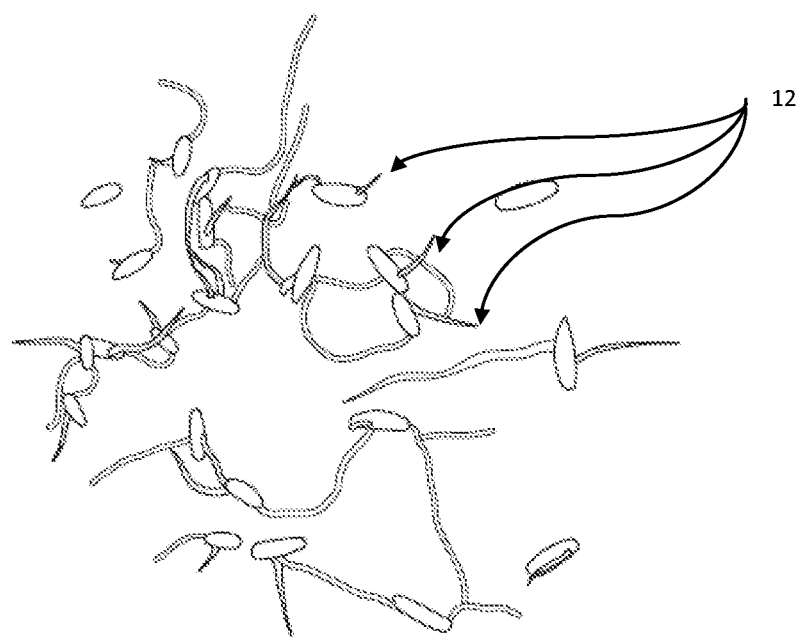

In a further trial a further 25 seeds from a seed and dry composition mixture were selected after storing the composition for another month at elevated temperatures (35° C.) and were placed between multiple layers of paper towels and saturated with water. The paper towels containing seeds were placed between two sheets of aluminum foil and the sides crimped. After 10 days at room temperature the seeds were removed and evaluated for germination and germination rate. The germination rate was 92%. An image of the germinated seeds 12 is shown in FIGS. 21A and 21B.

The rate of seed germination illustrated in the above trials is excellent and shows no compromise in germination as a result of mixing and storage previously with the dry composition comprising herbicide.

Example 14

Figure 22:
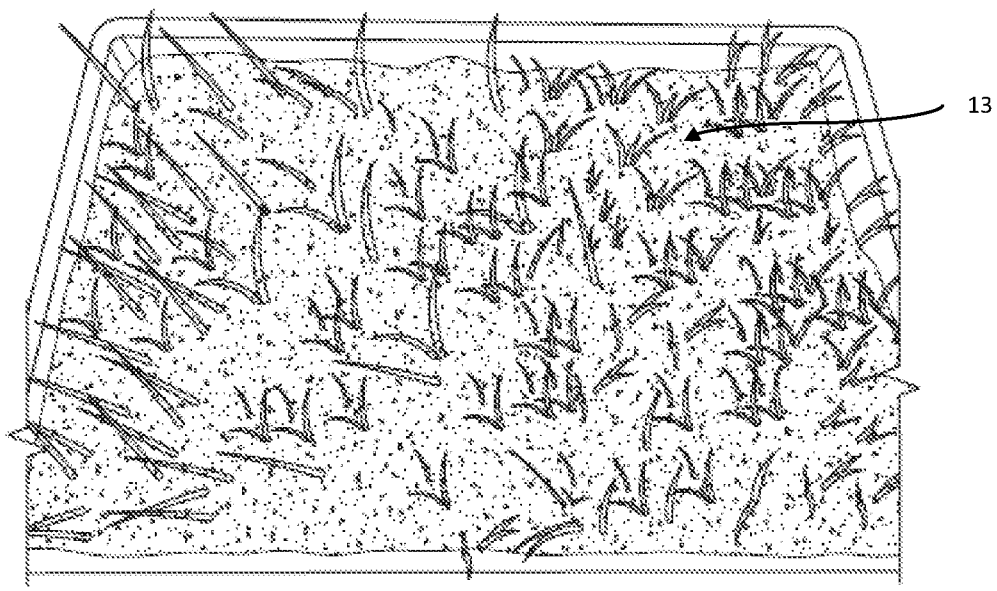
FIG. 22 shows a line drawing of a tray of germinating grass post broadcast of a seed and dry composition mixture and coverage by soil of the seed and dry composition mixture.

A further experiment was performed to evaluate if the herbicidal activity of the dry composition is influenced if the seed and dry composition are broadcasted to a substrate and then covered by a thin layer of soil as might be the case in dusty hill country subjected to wind. The seed and dry composition of Mixture 4 described above was spread over soil, covered with soil and watered. The soil was kept moist for two weeks. Results of experiment showed that, despite soil coverage, the seeds still germinated well with healthy shoots 13 growing in the sample plot as shown in the drawing of FIG. 22.

Aspects of the composition and related methods of manufacture and use have been described by way of example only and it should be appreciated that modifications and additions may be made thereto without departing from the scope of the claims herein.

What is claimed is:

1. A stable dry composition comprising:
   a carrier compound;
   a compound with herbicide activity located on an outer surface of the carrier compound and not substantially mixed into or homogenous with the carrier compound; and
   a compound with amphiphilic properties coating at least part or all of the compound with herbicide activity and the carrier compound to form a discrete outer layer not substantially mixed into or homogenous with the carrier compound or the compound with herbicide activity;
   wherein the compound with amphiphilic properties is a synthetic or natural molecule having an ability to self-assemble into structures comprising liposomes, bilayer sheets, micelles, vesicles, nanotubes, nanofibers, and lamellae or combinations thereof, and
   wherein the compound with amphiphilic properties is selected from phosphoglyceride or phosphotide compounds.

2. The dry composition as claimed in claim 1 wherein the dry composition is formulated as a particle, dust, powder, cake, prill or granular composition.

3. The dry composition as claimed in claim 1 wherein the compound with herbicide activity comprises an herbicide that is a non-selective herbicide or a selective herbicide.

4. The dry composition as claimed in claim 1 wherein the compound with herbicide activity comprises an herbicide that is one or more of soluble, able to be emulsified in aqueous solutions or other solvents.

5. The dry composition as claimed in claim 1 wherein the compound with herbicide activity comprises an herbicide that is selected from one or more of
   glyphosate, glyfosinate, glyfumesate, desmedipham, phenmedipham, MCPB, bentazone, dicamba, flumetsulam, phenoxy herbicides, 3,5,6-Trichloro-2-pyridinyloxyacetic acid, picolinic acid herbicides.

6. The dry composition as claimed in claim 1 wherein the compound with herbicide activity comprises an herbicide that comprises 0.1-60% weight of the dry composition based on the total weight of the dry composition.

7. The dry composition as claimed in claim 1 wherein the carrier compound provides a solid or semi-solid substrate on which the compound with herbicide activity is received and located during storage prior to application.

8. The dry composition as claimed in claim 1 wherein the carrier compound comprises 2-99.8% weight of the dry composition based on the total weight of the dry composition.

9. The dry composition as claimed in claim 1 wherein the carrier compound is a fertilizer or a mineral.

10. The dry composition as claimed in claim 9 wherein the carrier compound comprises one or more of lime, urea, phosphate, phosphate salts, super phosphate, ammonium sulphate, NPK, NPKS, magnesium oxide, gypsum.

11. The dry composition as claimed in claim 1 wherein the carrier compound retains the compound with herbicide activity on the outer surface of the carrier compound.

12. The dry composition as claimed in claim 1 wherein the compound with amphiphilic properties is formulated to delay release of the compound with herbicide activity and the carrier compound post application.

13. The dry composition as claimed in claim 1 wherein the compound with amphiphilic properties is a mixture of glycerophospholipids selected from
- phosphatidylcholine,
- phosphatidylethanolamine,
- phosphatidylinositol,
- phophatidylserine,
- phosphatidylglycerol,
- phosphatidic acid.

14. The dry composition as claimed in claim 1 wherein the compound with amphiphilic properties is lecithin.

15. The dry composition as claimed in claim 1 wherein the compound with amphiphilic properties comprises a coating, and wherein the coating comprises 0.01 to 50% by weight dry composition based on the total weight of the dry composition.

16. The dry composition as claimed in claim 1 wherein the compound with amphiphilic properties comprises a coating, and wherein a rate of release or elution rate of the coating is from 2 hours to 24 hours.

17. The dry composition as claimed in claim 1 wherein the dry composition is formulated for shipping and storing.

18. The dry composition as claimed in claim 1 wherein the dry composition is formulated for broadcasting to: a plant or a part thereof; a ground surface surrounding the plant or the part thereof; into a ground surrounding the plant or the part thereof; and combinations thereof.

19. The dry composition as claimed in claim 1 wherein the dry composition is formulated for co-administration with a plant seed, wherein the dry composition is mixed with the plant seed together as a dry mixture, stored until ready for use, then applied as a mixture to a ground surface or drilled into a ground.

20. A stable dry composition comprising:

a carrier compound;

a compound with herbicide activity located on an outer surface of the carrier compound and not substantially mixed into or homogenous with the carrier compound; and a compound with amphiphilic properties coating at least part or all of the compound with herbicide activity and the carrier compound to form a discrete outer layer not substantially mixed into or homogenous with the carrier compound or the compound with herbicide activity;

wherein the compound with amphiphilic properties is a synthetic or natural molecule having an ability to self-assemble into structures comprising
- liposomes, bilayer sheets, micelles, vesicles, nanotubes, nanofibers, and lamellae or combinations thereof, and wherein the compound with amphiphilic properties is a mixture of glycerophospholipids selected from
- phosphatidylcholine,
- phosphatidylethanolamine,
- phosphatidylinositol,
- phophatidylserine,
- phosphatidylglycerol, and
- phosphatidic acid.

* * * * *